United States Patent
Baumann

(10) Patent No.: US 7,699,390 B2
(45) Date of Patent: Apr. 20, 2010

(54) SEATING SYSTEM FOR PASSENGER SERVICE VEHICLES, FOR AIRCRAFT IN PARTICULAR

(75) Inventor: Jürgen Baumann, Ludwigshafen (DE)

(73) Assignee: RECARO Aircraft Seating GmbH & Co. KG, Schwäbisch Hall (DE)

(*) Notice: Subject to any disclaimer, the term of this patent is extended or adjusted under 35 U.S.C. 154(b) by 716 days.

(21) Appl. No.: 11/228,467

(22) Filed: Sep. 19, 2005

(65) Prior Publication Data

US 2007/0052263 A1    Mar. 8, 2007

(30) Foreign Application Priority Data

Sep. 7, 2005    (DE) ................ 10 2005 042 377

(51) Int. Cl.
   *A47C 7/62* (2006.01)
(52) U.S. Cl. .................. 297/124; 297/162; 297/169
(58) Field of Classification Search .............. 297/124, 297/147, 162, 169, 173, 14; 108/42, 44, 108/47

See application file for complete search history.

(56) References Cited

U.S. PATENT DOCUMENTS

| | | | | |
|---|---|---|---|---|
| 1,642,633 A | * | 9/1927 | Vittengl et al. | 312/298 |
| 3,374,032 A | * | 3/1968 | Del Giudice | 297/394 |
| 3,506,303 A | * | 4/1970 | Smittle et al. | 297/162 |
| 3,596,987 A | * | 8/1971 | Wilson | 297/188.07 |
| 3,877,747 A | * | 4/1975 | Brennan et al. | 297/124 |
| 3,910,632 A | * | 10/1975 | Marechal | 297/232 |
| 4,458,942 A | * | 7/1984 | Crossman | 297/332 |
| 4,533,175 A | | 8/1985 | Brennan | |
| 4,536,027 A | * | 8/1985 | Brennan | 297/124 |
| 5,133,587 A | * | 7/1992 | Hadden, Jr. | 297/146 |
| 5,374,104 A | * | 12/1994 | Moore et al. | 297/188.16 |
| 5,374,108 A | * | 12/1994 | Saul et al. | 297/378.1 |
| 5,524,959 A | * | 6/1996 | Scott | 297/125 |
| 5,842,743 A | * | 12/1998 | Wright et al. | 297/378.1 |
| 6,220,660 B1 | * | 4/2001 | Bedro et al. | 297/188.04 |

FOREIGN PATENT DOCUMENTS

DE    38 83 372    12/1993
EP    0 335 018    8/1993

OTHER PUBLICATIONS

The European Search Report in the corresponding EP application No. 06010594.7 dated Nov. 6, 2007.

* cited by examiner

*Primary Examiner*—Joseph F Edell
(74) *Attorney, Agent, or Firm*—Posz Law Group, PLC

(57) ABSTRACT

In a seating system for passenger service vehicles, and for aircraft in particular, having a seat structure (19), a seat element, a backrest (5), an arm rest (7), and table element (1), the table element (1) is movable between a storage position and a use position. In the use position, the table element (1) faring a table surface (3). The table element (1) is pivotally connected to the seat structure (19, 27) by lever mechanism (23, 33), and a power drive (21) is provided, which is coupled to the lever mechanism (23, 33) to form an over-center mechanism. The power drive (21) pivots the table element (1) from the storage position into an intermediate position, which is defined by the over-center mechanism, and from the intermediate position into the use position after over-centering of the intermediate position has been overcome by application of a force to the table element (1).

14 Claims, 4 Drawing Sheets

SEATING SYSTEM FOR PASSENGER SERVICE VEHICLES, FOR AIRCRAFT IN PARTICULAR

Figure 1:
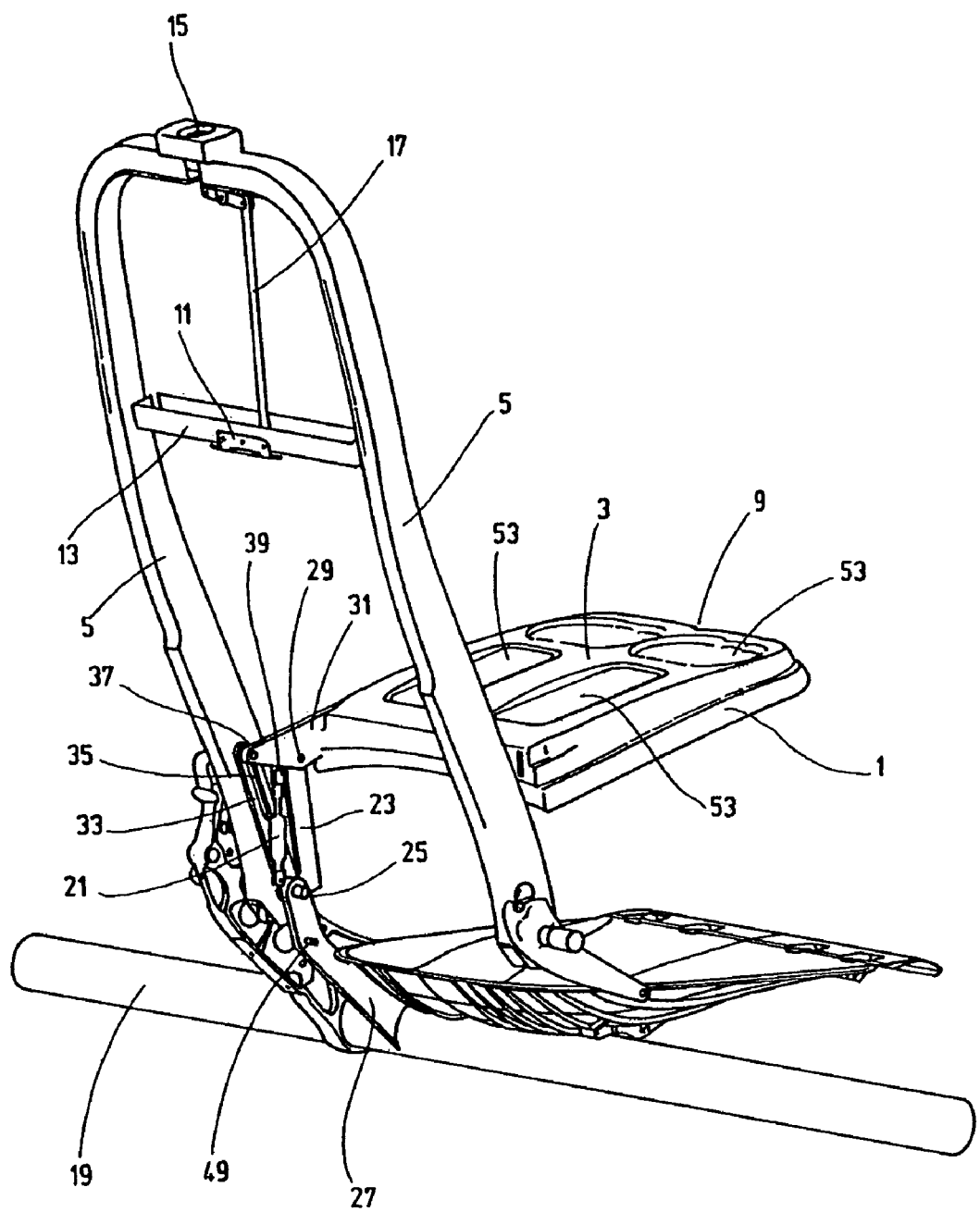

The invention relates to a seating system for passenger service vehicles, for aircraft in particular, with seat components such as seat structure, seat element, backrest, arm rest, and table element, the latter being movable between a storage position situated on the support area of the backrest and a use position at a distance from the support area, in which use position it forms a table surface which is at least approximately horizontal.

As is known, different comfort classes in correspondingly different fare categories are offered to passengers in passenger service vehicles such as aircraft or ferries. Seats differing in configuration are made available to the passengers, the width in particular of the seating area made available varying among the categories such as first class, business class, and economy class.

Configuration of seating systems for such applications so that the possibility exists of conversion for the purpose of adaptation to different comfort classes in seat rows with several seats positioned side by side is also of the prior art. EP 0 335 018 B1, for example, discloses a seating system of the kind described in the foregoing, one which may be converted so that a seating system with three seats positioned side by side (for economy class, for example) or a seat row with two seats is available, the width of the seating area being enlarged in the latter case and it being possible to move a table element into a use position in which it spans the intervening space remaining between the seats despite the enlargement of the width of the seating area.

The known solution does present disadvantages. In order to enlarge the seating width of the seats, the inside arm rests of the latter are moved a certain distance toward each other and, when in this position, form the bearing for the table element positioned on them when in the use position. The service properties of the known solutions are less than ideal. In order to move the table element, which forms a partially upholstered element of the backrest when in the stored position, into the use position, the table element must be removed manually from the main upholstery of the backrest and swung downward from the backrest to which it is hinge-connected until it is positioned on the arm rests. Since a tilted position of the backrest is provided in such seating systems, correct application to the arm rests is ensured only when the backrest is adjusted to specific positions.

In view of this prior art the object of the invention is to make available a seating system of the type discussed in the foregoing, one distinguished by comparatively better service properties.

It is claimed for the invention that this object is attained by a seating system possessing the properties specified in claim 1 in its entirety.

In that, in contrast to the known solution, the table element is pivot-connected to the seat structure by way of lever gearing and accordingly has no working connection to the backrest, adjustment of the table element is fully independent of inclined positions of the backrest. In addition, the solution claimed for the invention is especially user-friendly, since the presence of a mechanical drive coupled to the lever gearing in effect makes a servomechanism available, one which supports the seat occupant during transfer of the table element from the storage position to the use position. All that needs to be done for this purpose is for the seat occupant to unlock the table element in the storage position, for example, by operating a control button of a lock, after which the actuator automatically moves the table element away from the backrest area into an intermediate position. Since the actuator is coupled to the lever gearing to form an overcentering, the position of the table element in the intermediate position is defined. All that the seat occupant need do now is to apply to the table element an actuating force overcoming the overcentering, after which the actuator moves the table element automatically into the use position.

In preferred exemplary embodiments there is present between lever gearing and seat structure a stop mechanism which blocks the lever gearing from the positioning force generated by the power drive when the use position has been reached and thus supports the table element in the use position in relation to the seat structure. Consequently, in contrast to the known solution referred to above, no support of the table element by the adjoining arm rests is necessary, that is, the arm rests continue to be usable by the seat occupant with no restrictions, even if the table element is in the use position.

In advantageous exemplary embodiments the lever gearing is in the form of a pair of levers with two levers one end of which is pivotably mounted on one pivot axis fastened to the seat structure and extending in the direction transverse to that of the seat and the other ends of which are hinge-connected to the table element on articulations spaced at a distance from each other in relation to the longitudinal extent of the table surface.

A linear drive which generates a compressive force which acts between seat structure and table element and which for the purpose of introducing the compressive force engages on the table element a linkage point situated between the articulations of the levers may be provided as power drive associated with the lever gearing. If this positional relationship is established between the articulations of the levers and the linkage point on which the compressive force of the linear drive acts, the kinematics may be configured so that the turning moment effected by the power drive reverses the direction of action at the table element if the table element moves toward the use position or in the direction of the storage position by way of the intermediate position corresponding to the overcentering.

By preference a spring element, preferably a gas pressure spring, is provided as power drive, the gas pressure spring being supported on the seat structure by the pivot axis common to the two levers.

In one especially compact and advantageous form of the lever gearing the configuration is such that the one of the two levers which engages the first articulation positioned nearer the central area of the table surface on the table element is provided as support lever which defines a fixed axial distance between this articulation and the pivot axis on the seat structure, while the other lever is provided as guide lever which has, on the end remote from the seat structure, a guide slot extending in the longitudinal direction of the lever, in which a pivot pin forming the second articulation on the table element is movable under control.

In one exemplary embodiment, distinguished by high structural strength accompanied by especially compact design, the guide lever is in the form of a double lever having two side walls extending in parallel at a distance from each other, which side walls are interconnected by a crosspiece over a part of their length for formation of a U-section, there being guided between the two side walls, each of which is provided with a guide slot, a table carrier plate in the interior of the U-section on which plate the articulations of the levers and the linkage point of the power drive are provided, a pivot pin forming the second articulation extending from the table carrier plate on both sides in the respective guide slot.

In this instance the gas pressure spring provided as spring element may be hinge-connected to the seat structure in the interior of the U-section formed by the double lever on the pivot axis. This results in an especially space-saving design of the lever gearing.

By preference a table carrier plate engaged by lever gearing is provided on both sides of the table element.

The stop mechanism which defines the use position of the table element and supports this element in the use position may be configured so that the double lever in question has, on the end opposite the guide slots, a prolongation extending beyond the area of the pivot axis and forming part of the stop mechanism. When the table element is in the use position, this prolongation rests on a stop element of the seat structure so that pivoting movement of the lever gearing is blocked when the use position is reached.

As has already been stated, in that the table element is gear-connected directly to the seat structure, not on the backrest but by way of one of the sets of lever gearing, the table element is completely disconnected from movements of the backrest resulting in tilted positioning of the table element. However, the configuration may be such that the pivot axis, on which the respective lever gearing is hinge-connected to the seat structure, is positioned so as to be aligned with the tilt axis which is provided for adjustment of the tilt of the backrest.

Figure 2:
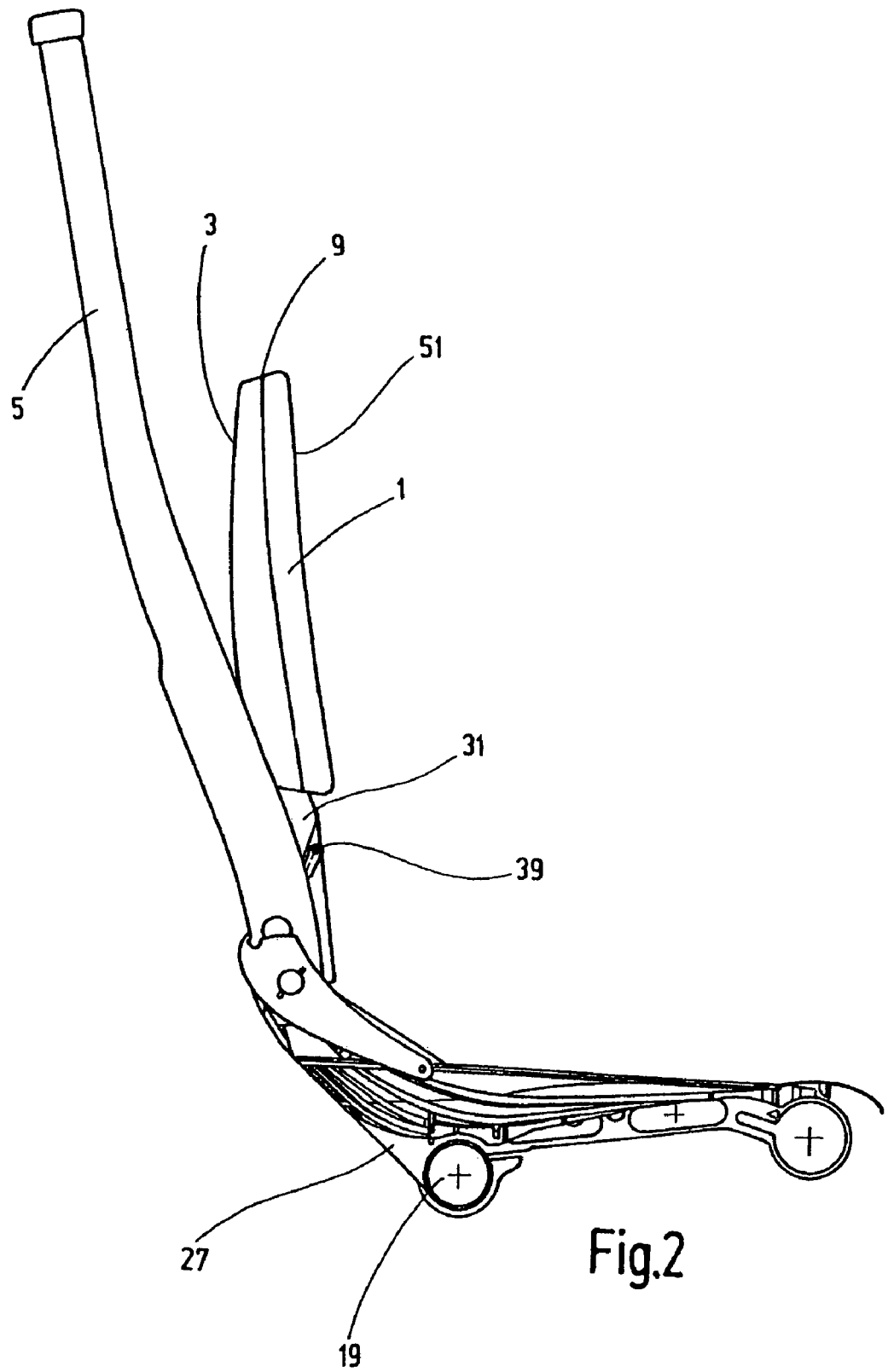
Figure 3:
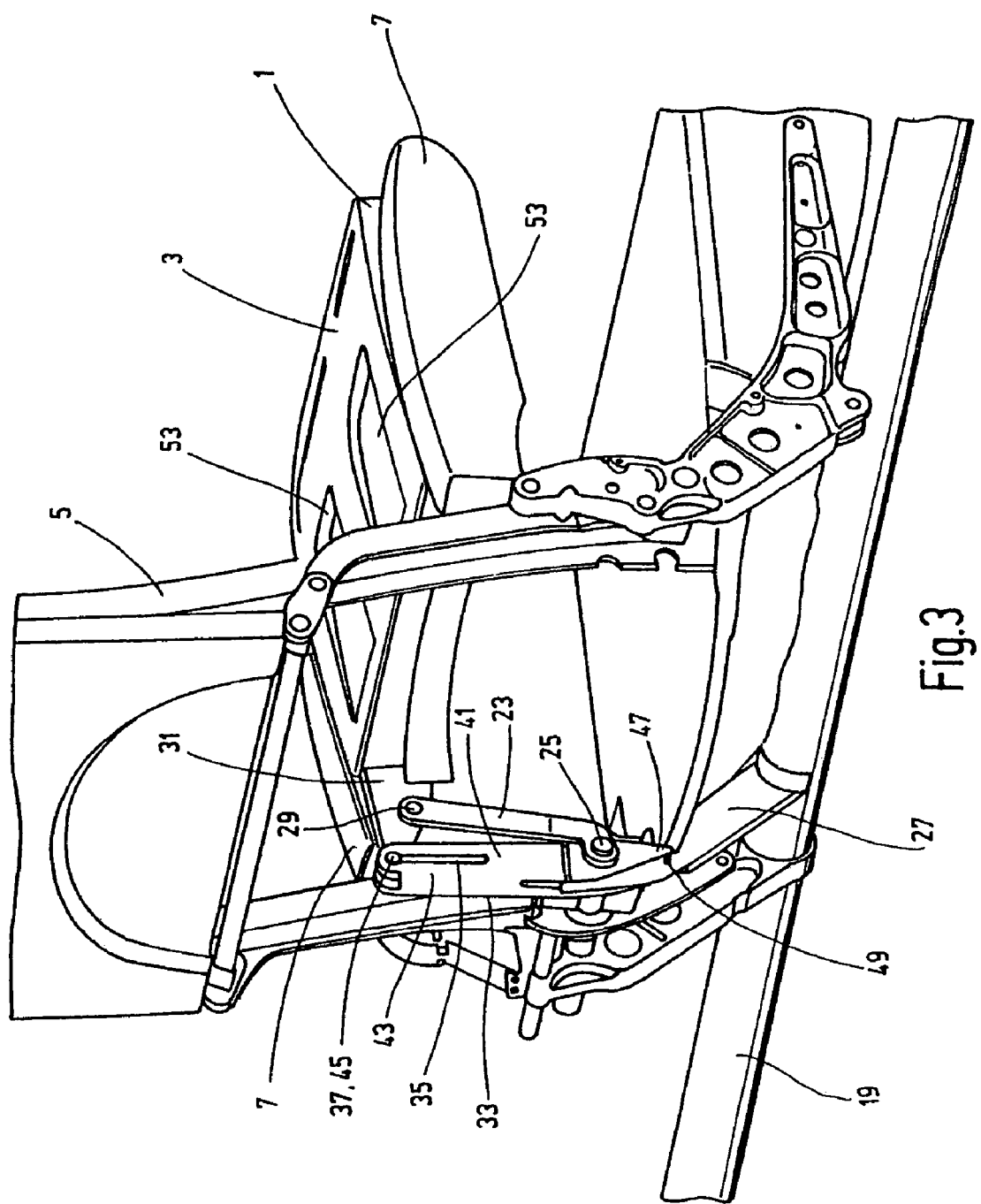

The invention is described in detail below on the basis of an exemplary embodiment illustrated in the drawing, in which FIG. 1 presents a diagonal perspective view in which only some of the structural elements, essential for understanding the invention, are shown of the central seating area with three seats positioned side by side in accordance with an exemplary embodiment of the seat system claimed for the invention, a table element being shown in its use position and a lever gearing not being shown in its entirety;

FIG. 2 a diagrammatic side view of the structural elements shown in FIG. 1, the table element being presented in a position partly tilted in relation to its storage position; and FIG. 3 a perspective diagonal view drawn on a scale somewhat larger than that of FIGS. 1 and 2, a view in which the lever gearing, in contrast to FIG. 1, is shown in its entirety.

Figure 4:
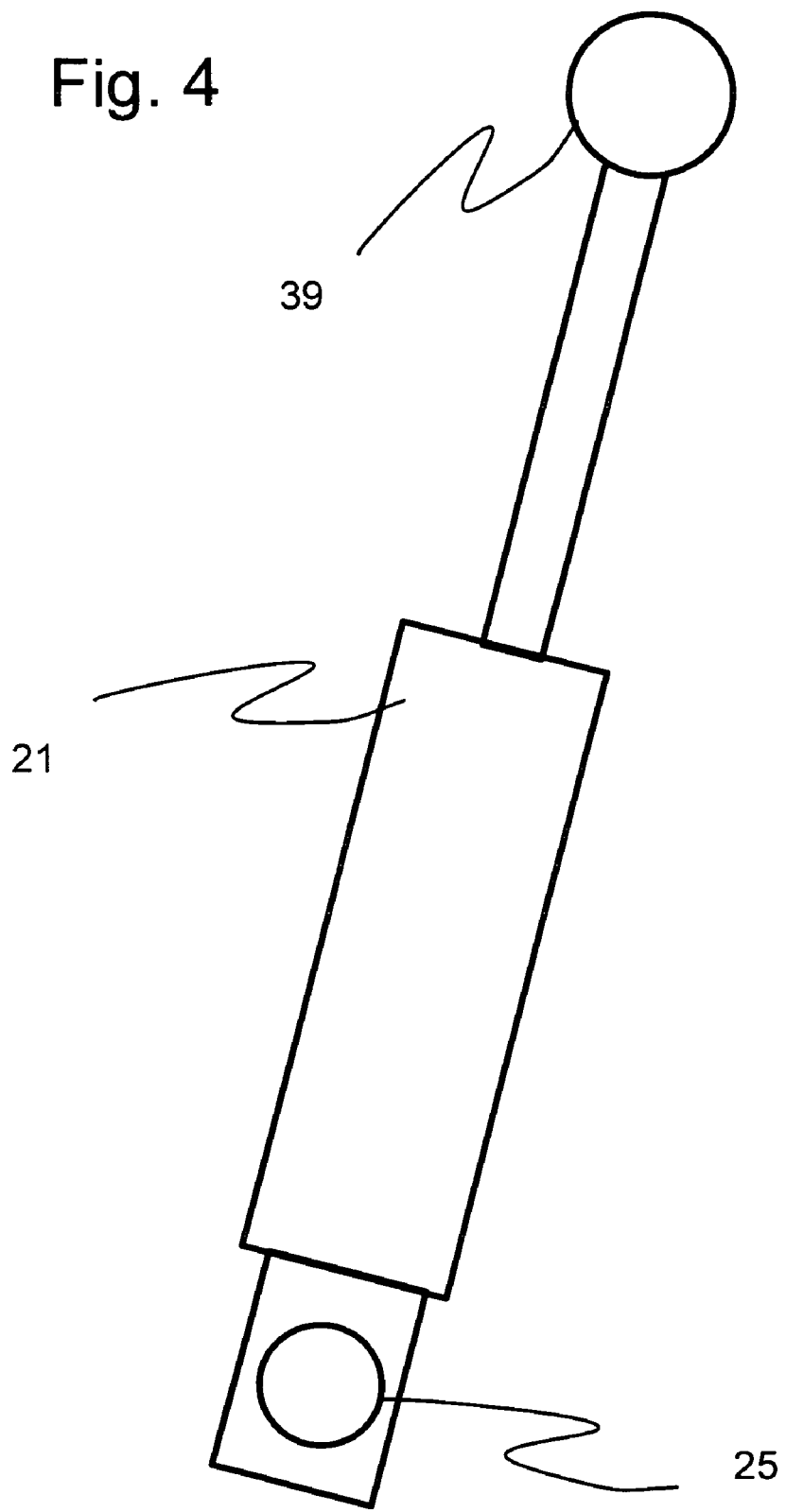

FIG. 4 is a partial schematic view showing the connection of a gas spring element between a linkage point and a pivot axis.

FIGS. 1 and 3 show a table element 1 in its use position, in which it forms with one of its large areas a table surface 3 which is approximately horizontal (in relation to the normal installed position of the seat system). This table surface 3 extends from the area of a backrest, of which only the rest frame with bars 5 is shown, between arm rests (FIG. 3) forward in the direction of travel (direction of flight), the longitudinal extent of the table surface in the example illustrated ending at the front end area of the arm rests 7. The table element may be transferred from the use position shown in FIGS. 1 and 3 to a storage position, in which it forms a part of the support area of the backrest, between the bars 5 of the backrest, with its large surface (configured as an upholstered surface) opposite the table surface 3.

In this storage position not shown in the figures there is a bolt element (not shown) which is positioned on the end edge 9 (FIG. 1) of the table element 1 and which is in locking engagement with a controllable locking mechanism 11 on a crossbar 13 of the bars 5. The locking mechanism 11 may be unlocked by operating a release button 15 which is accessible to the seat occupant on the upper side of the backrest and is connected to the locking mechanism 11 by a control rod 17.

For its adjustment movements between the storage position (not shown) and the use position the table element 1 is connected to the fixed seat structure 19 by lever gearing in the form a lever pair of two articulated levers and is associated with a power drive, specifically a linear drive in the form of a gas pressure spring 21. One lever of the pair forming the lever gearing is a support lever 23 which is pivot-mounted on one end of a pivot axis 25 which is provided on a fixed structural element 27 of the seat structure 19. The support lever 23 is connected at its other end to an articulation 29 on the table carrier plate 31 of the table element 1. While the support lever 23 defines a fixed axial distance between the pivot axis 25 fixed on the structure and the articulation 29 on the table carrier plate 31, the second lever of the lever pair making up the lever gearing is in the form of a guide lever 33 one end of which is pivot-mounted on the pivot axis fixed on the structure, but in its opposite end area forms no fixed pivot point and rather has a guide slot 35 extending in the longitudinal direction of the lever and forming a pin-slot connection with an articulation 37 on the table carrier plate 31 of the table element 1.

As is to be seen in FIGS. 1 and 2, the gas pressure spring 21, which is hinge-connected by the end of the structure to the pivot axis 25, by its pressure rod engages a linkage point 39 on the table carrier plate 31, this linkage point 39 being positioned between the articulations 29 and 37 for connection to the levers 23 and 33. FIG. 4 schematically shows the gas spring hinge-connected, or pivotally connected, to the pivot axis 25.

As has been pointed out, the lever gearing in FIG. 1 is not shown in its entirety. In order to facilitate understanding by simplifying the diagram, in FIG. 1 only one of the two side walls 41 is shown of the guide lever 33 configured with two parallel side walls. This is done to make visible the gas pressure spring 21 part of the length of which extends between the side walls 41 of the guide lever 33 which over part of its length forms a partly closed U-section, since the side walls 41 are connected to each other by a crosspiece 43 over part of the length of the guide lever 33. Each of the side walls 41 is provided with a guide slot 35 in which a pivot pin 45 is guided which extends on both sides of the table carrier plate 31 which in the area of the articulation 37 is also guided between the side walls 41 of the guide lever 33.

As is shown only in FIG. 3, the side walls 41 of the guide lever 33 are extended outward by the pivot axis 25 so that a continuation 47 is formed which adjoins a stop element 49 on the fixed structural element 27 when the table element 1 is in the use position (see FIG. 3). The use position of the table element 1 is positively locked in the use position as a result of the pivoting movement of the guide lever 33 as thus defined and as a result of the fact that the pivot pins 45 of the table carrier plate 31 adjoin the upper end of the guide slot 35 when in the use position and of the fact that the table element 1 is supported by the pivot axis 25 by way of the support lever 23.

If the table element 1 is tilted upward from the use position against the turning moment generated by the gas pressure spring 21, when the intermediate position shown in FIG. 2 has been reached the lever gearing reaches the state of overcentering, so that no additional turning moment acts on the table element 1. If the table element is moved further from this intermediate position (FIG. 2) toward the backrest, so that the overcentering of the lever gearing is overcome, the table element 1 is again subjected to a turning moment generated by the gas pressure spring 21, a moment which acts clockwise in the illustration in FIG. 2. The table element may now be forced completely into the storage position against this turning moment, the locking element positioned on the end edge 9 of the table element 1 being fastened by the locking mechanism 11. When in this position the table element 1 may form part of the support area of the backrest. For this purpose the table element 1 has an upholstered surface 51 on the side opposite the table surface 3 (see FIG. 2).

As is shown by FIGS. 1 and 3, the table surface 3 may be provided with trough-like recesses 53 so that clearly defined surfaces for setting down beverages and the like may be formed.

The invention claimed is:

1. A seating system for passenger service vehicles comprising:
 a seat structure;
 a backrest, wherein the backrest includes a support area;
 a table element, which is movable between a storage position and a stable, horizontal use position;
 a lever mechanism, for mounting the table element pivotally with respect to the seat structure;
 a power drive, which is coupled to the lever mechanism to form an over-centering device; and
 a locking mechanism, which is controllable by an operator, wherein
 the locking mechanism locks the table element in the storage position against the action of the power drive,
 after the locking mechanism has been released, the power drive acts to automatically pivot the table element from the storage position into a stable, intermediate position situated between the storage position and the use position,
 an application of force to the table element to pivot the table element from the intermediate position towards the use position overcomes an over-centering of the over-centering device, and
 after the over-centering of the over-centering device has been overcome, the power drive acts to automatically pivot the table element into the use position.

2. The seating system as claimed in claim 1, wherein a stop mechanism is located between the lever mechanism and the seat structure, and when the use position has been reached, the stop mechanism blocks the lever mechanism from being further moved by the positioning force generated by the power drive and thereby supports the table element in the use position in relation to the seat structure.

3. The seating system as claimed in claim 2, wherein
 the lever mechanism has two levers,
 each lever has a first end pivotally mounted on a pivot axis, which is fixed with respect to the seat structure,
 the pivot axis extends in a lateral direction of the seat structure,
 each lever has a second end, which is pivotally connected to the table element at articulations, which are spaced apart from each other in a direction that is perpendicular to the pivot axis.

4. The seating system as claimed in claim 3, wherein the power drive is a linear drive for generation of a compressive force acting between the seat structure and the table element, wherein the linear drive engages a linkage point positioned between the articulations of the two levers for applying force to the table element.

5. The seating system as claimed in claim 4, wherein the power drive is a spring element, which is pivotally coupled to the seat structure, at the pivot axis.

6. The seating system as claimed in claim 5, wherein the spring element is a gas spring.

7. The seating system as claimed in claim 5, wherein
 the articulations include first and second articulations, and the first articulation is positioned nearer to a center of the table element than the second articulation,
 a first one of the levers, which is pivotally connected to the first articulation, is a support lever, and the support lever defines a fixed axial distance between the first articulation and the pivot axis,
 a second one of the levers is a guide lever, and at the second end of the second lever, which corresponds to the second articulation, a guide slot extends in a longitudinal direction of the second lever,
 the guide slot guides a pivot pin, which is part of the second articulation, so that the pivot pin moves within the guide slot when the table is moved between the storage position and the use position.

8. The seating system as claimed in claim 7, wherein
 the guide lever is in the form of a double lever with two parallel walls spaced apart from each other,
 the walls are interconnected by a crosspiece to form a U-section,
 the guide slot is one of a pair of guide slots formed respectively in the walls,
 located in the interior of the U-section is a table carrier plate of the table element, and the articulations and the linkage point are located on the table carrier plate,
 the pivot pin extends from opposite sides of the table carrier plate to the pair of guide slots, respectively to form the second articulation.

9. The seating system as claimed in claim 8, wherein the spring element is pivotally connected to the pivot axis on the seat structure in the interior of the U-section.

10. The seating system as claimed in claim 9, wherein a continuation is formed at the first end of the guide lever has to extend beyond the pivot axis to form part of the stop mechanism, wherein the continuation is adjacent to a stop element of the seat structure when the table element is in the use position in order to block the pivoting movement of the lever mechanism when the use position has been reached.

11. The seating system as claimed in claim 1, wherein
 the lever mechanism has a pivot axis,
 the backrest is mounted for the purpose of adjustment of the inclination of the support area of the backrest to pivot about an axis of inclination, and
 the pivot axis of the lever mechanism and the axis of inclination of the backrest are the same axis.

12. The seating system as claimed in claim 1, wherein the lever mechanism is configured such that the power drive automatically moves the table element from the stable, intermediate position into the use position after an over-centering is overcome by a force applied to the table element.

13. The seating system as claimed in claim 1, wherein the table element is connected directly to the seat structure.

14. The seating system as claimed in claim 13, wherein the back rest is pivotally mounted to incline with respect to the seat structure, and the backrest is configured such that inclination of the backrest is completely independent of pivotal movement of the table element about the pivot axis.

* * * * *